US006537017B2

(12) United States Patent
Stone

(10) Patent No.: US 6,537,017 B2
(45) Date of Patent: Mar. 25, 2003

(54) CANTILEVERED, SELF-ADJUSTING PNEUMATIC PALLET POSITIONER

(75) Inventor: Robert M. Stone, Oro Valley, AZ (US)

(73) Assignee: Bishamon Industries Corporation, Ontario, CA (US)

( * ) Notice: Subject to any disclaimer, the term of this patent is extended or adjusted under 35 U.S.C. 154(b) by 0 days.

(21) Appl. No.: 09/780,297

(22) Filed: Feb. 9, 2001

(65) Prior Publication Data

US 2002/0110447 A1 Aug. 15, 2002

(51) Int. Cl.$^7$ ................................................. B66B 7/00
(52) U.S. Cl. ..................... 414/672; 414/673; 414/925; 414/792.3; 414/495; 414/793.8; 414/796.7; 254/2 R; 187/269; 187/275
(58) Field of Search ................................. 414/672, 799, 414/495, 924, 925, 926, 792.2, 792.3, 792.4, 796.7, 794.6, 793.8; 187/275, 284, 269, 251; 254/2 R; 271/215, 217, 219

(56) References Cited

U.S. PATENT DOCUMENTS

| 2,626,727 A | * | 1/1953 | Gibbs et al. |
| 3,694,044 A | * | 9/1972 | Cummings .................... 312/71 |
| 3,763,965 A | * | 10/1973 | Riekkinen ............ 280/47.29 X |
| 4,764,075 A | * | 8/1988 | Cox et al. ................ 414/925 |
| 5,147,170 A | * | 9/1992 | Detrick .................... 414/673 X |
| 5,217,090 A | * | 6/1993 | Billington, III et al. 414/921 X |
| 5,299,906 A | | 4/1994 | Stone ....................... 414/792.3 |
| 5,542,500 A | * | 8/1996 | Emrey ......................... 187/273 |
| 5,575,605 A | * | 11/1996 | Fisher ........................ 414/490 |
| 5,771,816 A | * | 6/1998 | Zaguroli, Jr. ................ 108/147 |
| 5,782,602 A | | 7/1998 | Mehta et al. ............... 414/672 |
| 5,885,047 A | * | 3/1999 | Davis et al. ................ 414/490 |
| 5,934,414 A | * | 8/1999 | Staczek ..................... 187/269 |
| 5,975,246 A | * | 11/1999 | Toschi ........................ 187/275 |
| 5,993,146 A | * | 11/1999 | Hallgren ................. 414/672 X |

FOREIGN PATENT DOCUMENTS

FR 2594815 * 8/1987 ............... 414/92 X

* cited by examiner

Primary Examiner—Frank E. Werner
(74) Attorney, Agent, or Firm—Antonio R. Durando; Durando Birdwell & Janke, PLC

(57) ABSTRACT

A pallet positioner includes a support frame that consists of a main upright structure with a pair of spaced, parallel outriggers extending horizontally at ground level. The distal ends of the outriggers are connected by a flat, low-profile ramp. The upright structure includes a pair of vertical guide masts rigidly mounted on a horizontal base bracing the proximal ends of the outriggers. A cantilevered carrier with a rotatable platform is mounted laterally for vertical motion along the vertical guide masts. A pneumatic bellows and an air reservoir in the base are adapted to raise and provide self-leveling to the platform. Two hydraulic cylinders provide dampening and a stabilizing effect. The flow of hydraulic fluid in the cylinders is used to control the motion of the carrier. A braking system under the platform prevents its rotation at ground level.

28 Claims, 16 Drawing Sheets

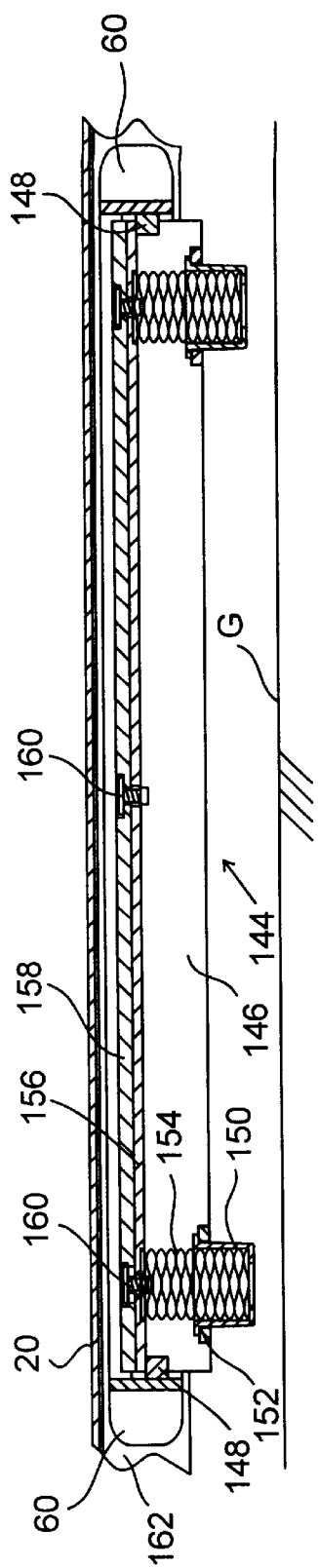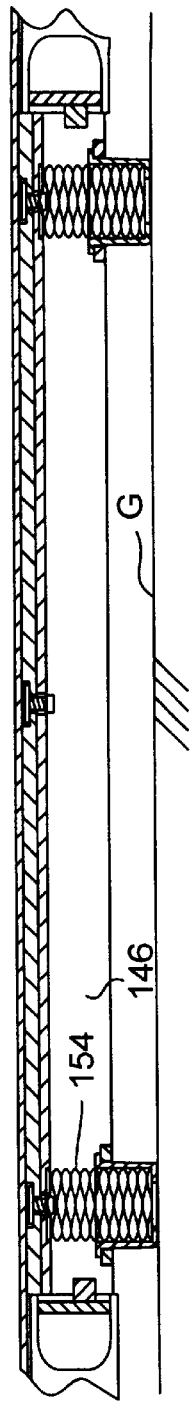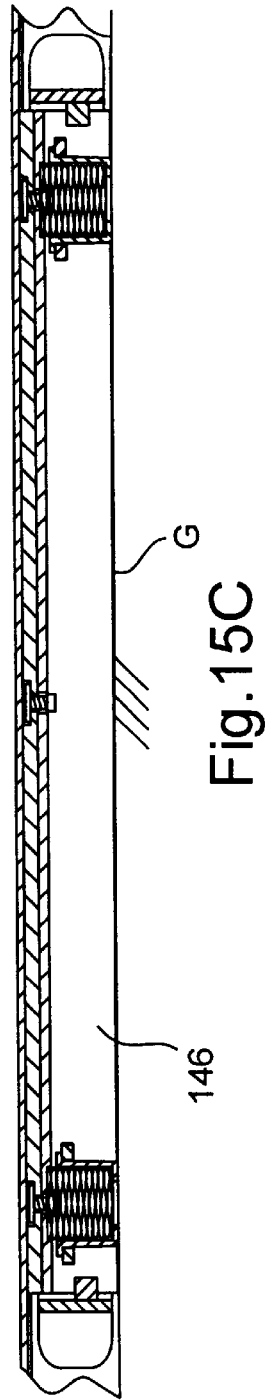
Fig.15A
Fig.15B
Fig.15C

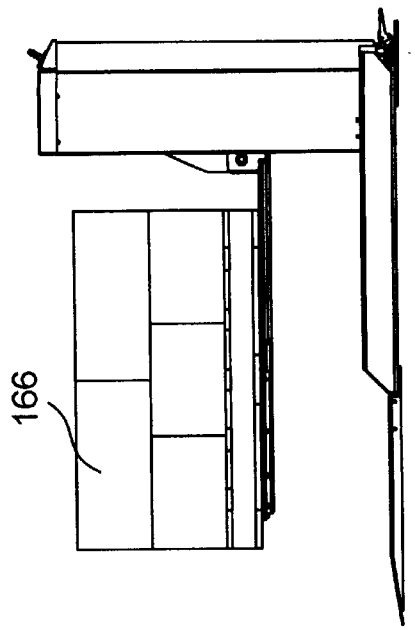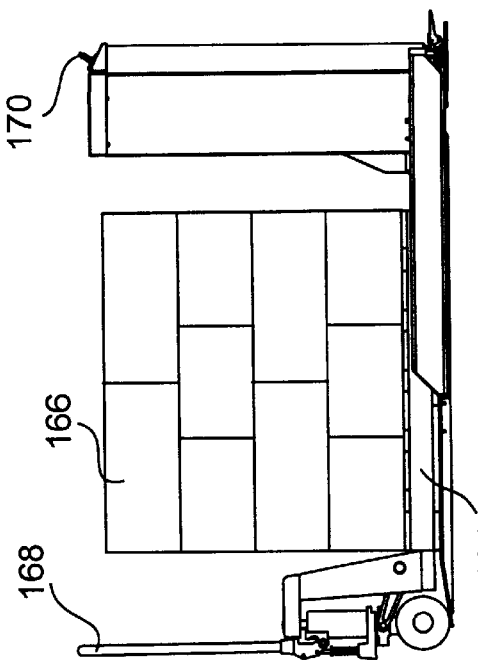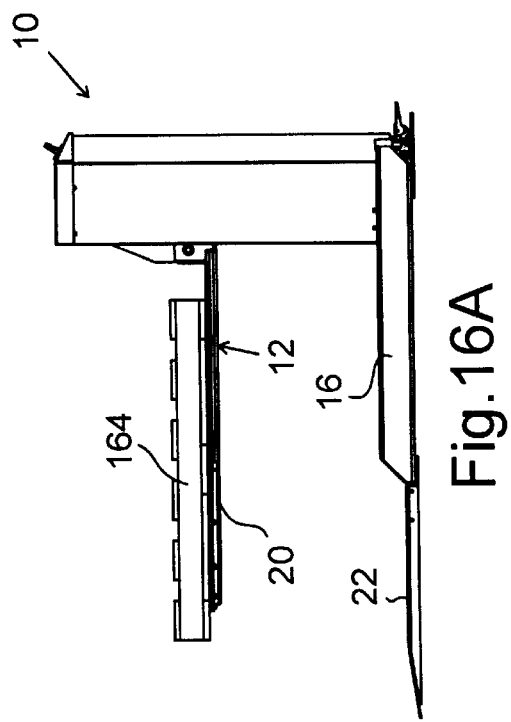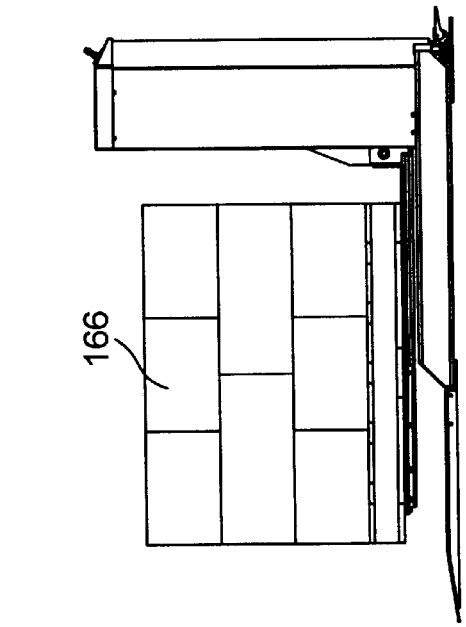

CANTILEVERED, SELF-ADJUSTING PNEUMATIC PALLET POSITIONER

BACKGROUND OF THE INVENTION

1. Field of the Invention

The invention relates to pallet positioners for loading and unloading packages or objects unto pallets from an elevated position; more specifically, it relates to a pallet positioner that can maintain the top of a changing load at a convenient predetermined height.

2. Description of the Prior Art

In the handling of a number of packages, boxes, or other objects, a common task is to manually transfer them between an elevated table, conveyor, shelf, or other similar location, and a pallet resting on the floor. While the shelf, for example, remains at a fixed height, the top of the load on the pallet, where the next box or object is to be loaded or removed, usually is at a different height which varies as the packages, etc., are piled on or removed from the pallet. This difference in height, and the changes in this difference during loading or unloading of the packages, can be fatiguing for the person doing the moving. Therefore, pallet positioners, also known in the art as load elevators, have been developed for raising the pallet from the floor to a more convenient height and even for automatically adjusting the height of the pallet as the load increases or decreases, so that the preferred height of the top of the load is maintained.

U.S. Pat. No. 5,299,906 discloses a self-adjusting pallet positioner supported by a scissors linkage located under the load platform. The vertically expandable scissors linkage is coupled to an air-actuator chamber that includes a compressible bellows and a fixed-volume reservoir placed under the load platform. The bellows is compressible between specified maximum and minimum bellows heights which correspondingly determine substantially different maximum and minimum bellows volumes. The air reservoir is coupled to the bellows and has a fixed volume that is substantial compared to the difference between the maximum and minimum bellows volumes. As a result of this configuration, the pallet positioner exhibits very good self-leveling characteristics.

In the positioner's unloaded condition the scissors linkage is extended and the platform is situated at a convenient level for loading packages and/or materials over a pallet placed on the platform. As boxes or crates are stacked on the pallet and the weight and height of the stack on the pallet increase, the scissors linkage and the air bellows automatically contract under the load and the platform sinks approximately in proportion to the height increase of the stack for uniform loads. Thus, the top of the stack is maintained at a roughly constant level by the self-leveling feature and the stacking process is facilitated.

When the pallet is fully loaded, it is removed from the platform with a fork lift or a pallet truck. At this time, the platform is in its lowest position. In order to permit removal of the loaded pallet with a pallet truck, though, the platform needs to be at or near ground level. To this end, the elevator is installed over a pit which can receive the scissors linkage and bellows in the lowermost position of the platform. While this arrangement operates satisfactorily, the need for a pit increases costs, poses potential hazards, and prevents the elevator from being readily relocated.

U.S. Pat. No. 5,782,602 describes a low-profile pallet positioner designed to overcome the need for a pit while using a pallet truck in removing the loaded pallet from the positioner's platform. The device consists of an upright, lateral housing and a pair of spaced, parallel outriggers extending from the housing. Vertical guide rods are mounted on the exterior of the housing and a cantilevered platform assembly is movable over the outriggers up and down along the guide rods. In its lowermost position, the platform assembly sits on the ground between the outriggers, thereby permitting the placement of a pallet truck under the pallet and its removal from the platform. The cantilevered platform assembly is driven by a cylinder-and-piston unit which is disposed inside the lateral housing and engages the periphery of the assembly through a slot in a wall of the housing. The cylinder-and-piston unit is extended and retracted by a power unit consisting of a motor, pump and tank likewise disposed inside the housing. Because of the need to maintain a sufficiently low platform profile to permit pallet-truck access to the pallet when the platform is at its lowest position, no pneumatic bellows is included under the platform. Accordingly, no self-leveling mechanism is provided. Therefore, the platform is raised and lowered strictly as needed by the operation of the power unit. As such, the advantages of a self-leveling operation are lost.

The present invention is directed at providing a low-profile self-adjusting pallet positioner that permits the removal of a loaded pallet from its platform using a conventional pallet truck. The invention combines a cantilevered-platform configuration, designed to produce a low profile, with a pneumatic bellows unit placed on the side of the platform to provide self-leveling operation.

SUMMARY OF THE INVENTION

It is an object of the invention to provide a self-leveling stacking and unstacking device with a sufficiently low platform profile to permit pallet unloading with a conventional pallet truck.

It is a further objective of the invention to provide a pallet positioner with a safety mechanism for preventing sudden or jerky motion that may be dangerous to a user.

Another object is a pallet positioner with a rotatable load platform to permit easy access to all parts of the pallet from a loading or unloading station.

According to these and other objectives, the present invention includes a support frame that consists of a main upright structure with a pair of spaced, parallel outriggers extending horizontally at ground level. The distal ends of the outriggers are connected by a flat, low-profile ramp. The upright structure includes a pair of vertical guide masts rigidly mounted on a horizontal base bracing the proximal ends of the outriggers. A platform assembly consisting of a cantilevered carrier with a rotatable platform is mounted laterally in rolling engagement on the vertical guide masts for vertical motion along the upright structure. In its lowermost position, the platform assembly sits on the ground between the outriggers and the low-profile ramp. A braking system under the platform prevents its rotation at ground level.

According to one aspect of the invention, a pneumatic bellows and an air reservoir are mounted on the horizontal base between the guide masts. The bellows is adapted to raise the carrier by acting on a pulley block connected to two vertical hydraulic cylinders mounted on the horizontal base. A belt with opposite ends affixed to the carrier and the base cooperates with the pulley block to position the carrier at a vertical height corresponding to the bellows expanded state. As the load placed on the carrier increases, the bellows is compressed and the carrier lowered proportionally, such that the top of the load on the cantilevered platform remains approximately at the same height. Accordingly, the initial pressure in the bellows and air reservoir is chosen to produce the desired height adjustments as a function of the expected density of the materials to be loaded on the platform.

In accordance with another aspect of the invention, the hydraulic cylinders provide dampening that prevents oscillations when the carrier is lowered in response to incremental loads placed on the platform. The cylinders also provide a stabilizing structure to ensure the linear vertical expansion and contraction of the resilient bellows chamber in response to load changes. Further, the flow of hydraulic fluid to and from both sides of the cylinders is regulated with valves to prevent the uncontrolled upward motion of the carrier when the load is decreased and to provide a safety check before the platform is lowered to ground level. Because the self-leveling mechanism of the invention provides the upward force needed to support the load placed on the carrier, this pallet positioner does not require an independent actuating unit for raising or lowering the platform assembly.

Additional features and advantages of the invention will be forthcoming from the following detailed description of preferred embodiments when read in conjunction with the accompanying drawings.

BRIEF DESCRIPTION OF THE DRAWINGS

FIGS. 15A–15C are sectioned views of the brake mechanism of the invention illustrating its functioning as the carrier approaches ground level.

FIGS. 16A–16D illustrate the pallet positioner of the invention through a typical cycle of operation.

DESCRIPTION OF THE PREFERRED EMBODIMENTS

Figure 1:
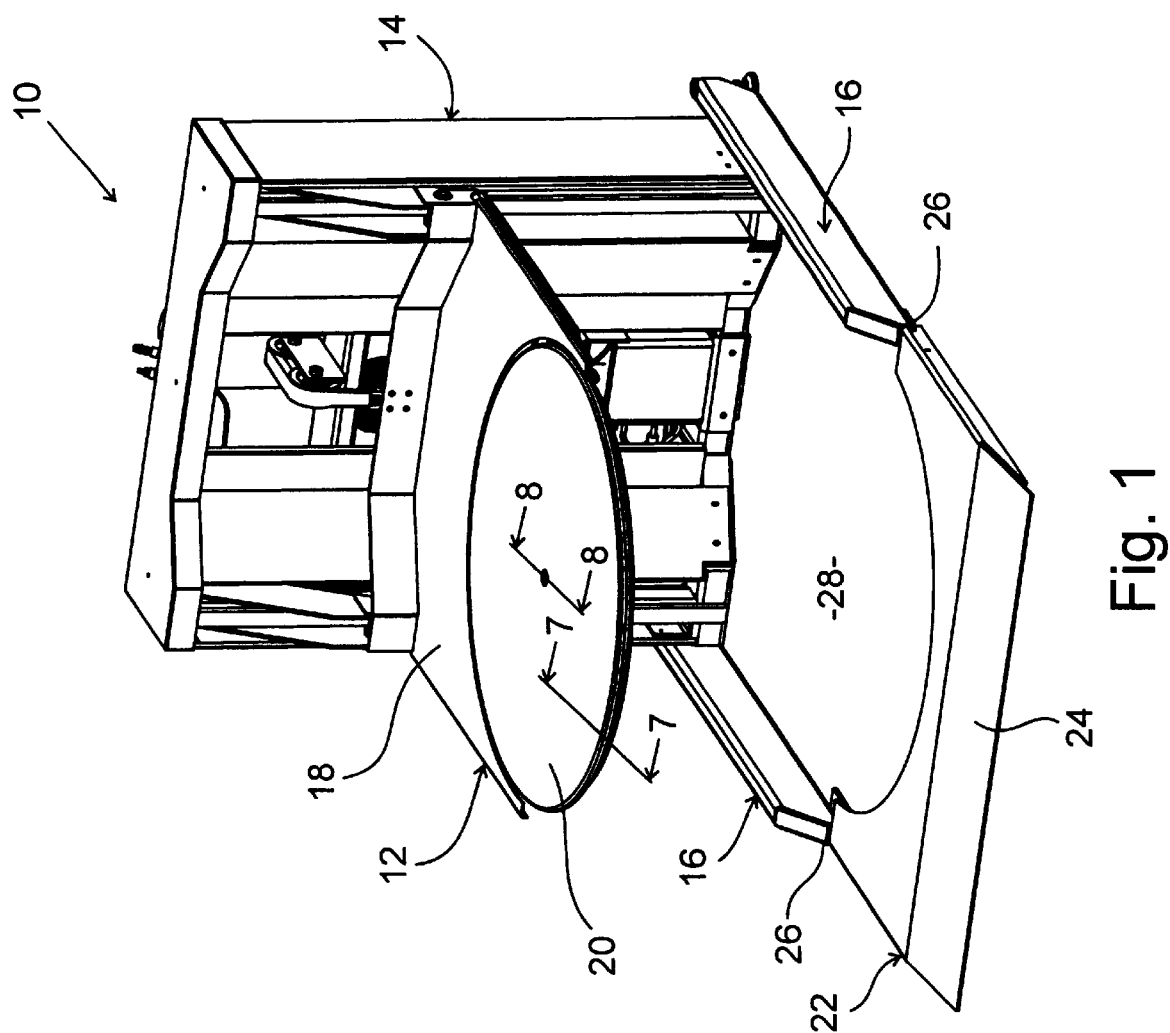
FIG. 1 is a front perspective view of a pallet positioner according to the preferred embodiment of the invention.
Figure 2:
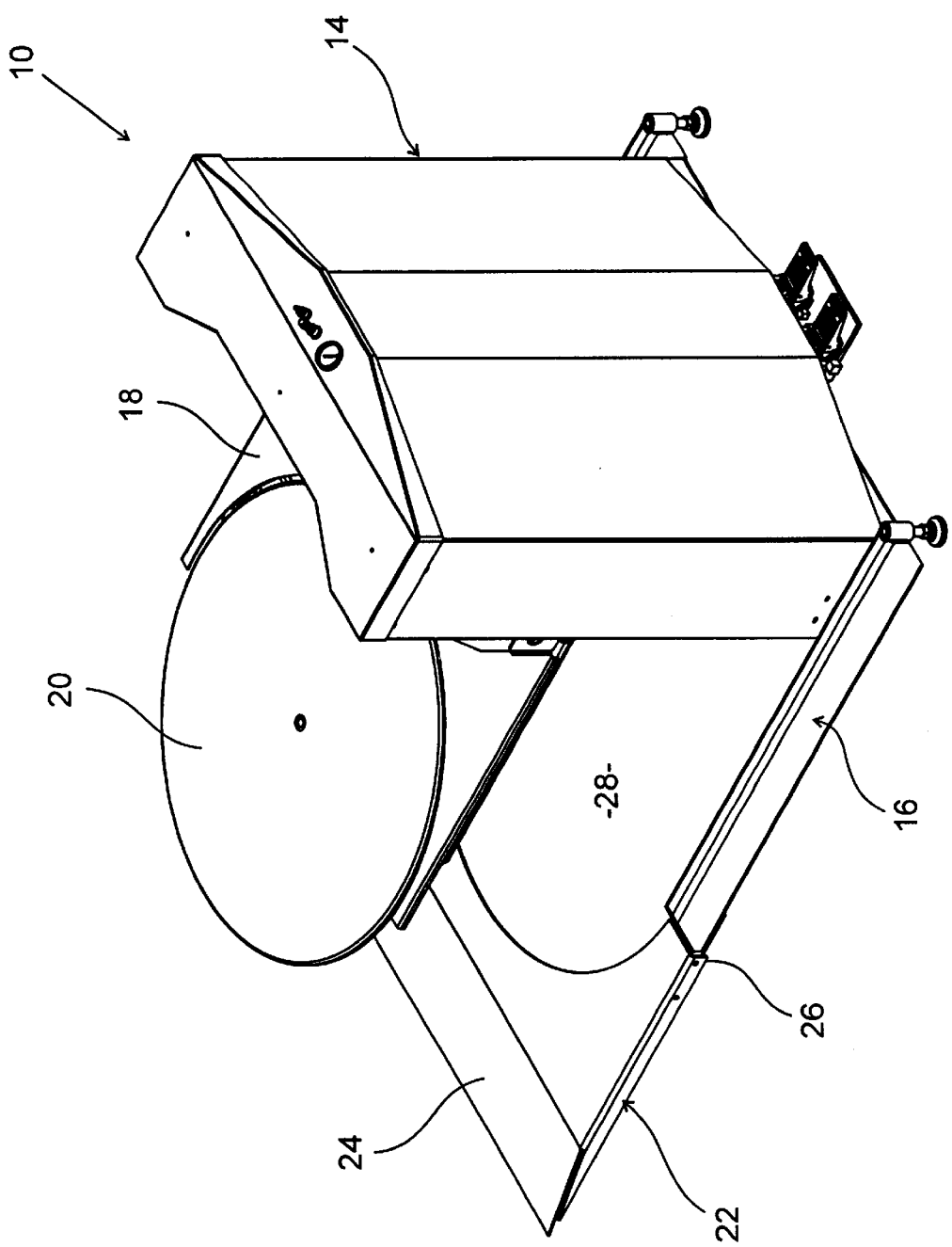
FIG. 2 is a rear perspective view of the pallet positioner of FIG. 1.

The invention lies in the combination of an air-bellows self-leveling mechanism with a low-profile cantilevered platform assembly and the hydraulic system utilized to stabilize the bellows and control the platform's vertical motion. Referring to the drawings, wherein like parts are designated throughout with like numerals and symbols, FIGS. 1 and 2 illustrate a pallet positioner 10 according to the invention in front and rear perspective views, respectively. The positioner 10 includes a horizontal platform assembly 12 mounted laterally in cantilevered arrangement on a vertical structure 14 that is supported by two parallel outriggers 16 extending laterally at ground level from the structure 14. The platform assembly 12 consists of a carrier 18 and a rotatable platform 20 mounted on the carrier. A low-profile flat ramp 22 with a beveled front lip 24 braces the distal ends 26 of the outriggers 16 and defines a ground-level space 28 designed to accommodate the carrier 18 and platform 20 when the assembly 12 is in its lowermost position.

Figure 3:
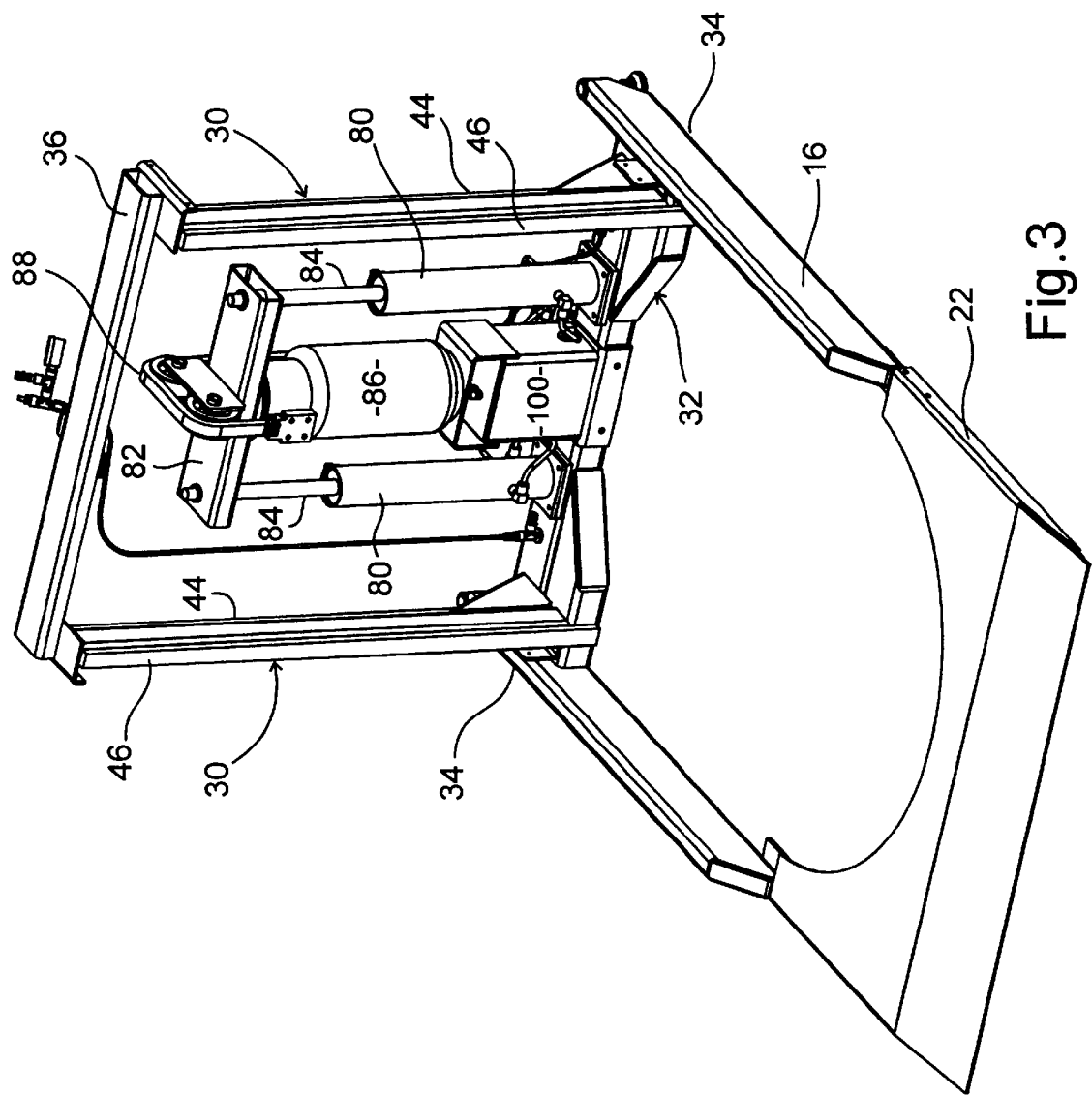
FIG. 3 is a front perspective view of the functional components constituting the stationary structural elements of the pallet positioner of FIG. 1.
Figure 4:
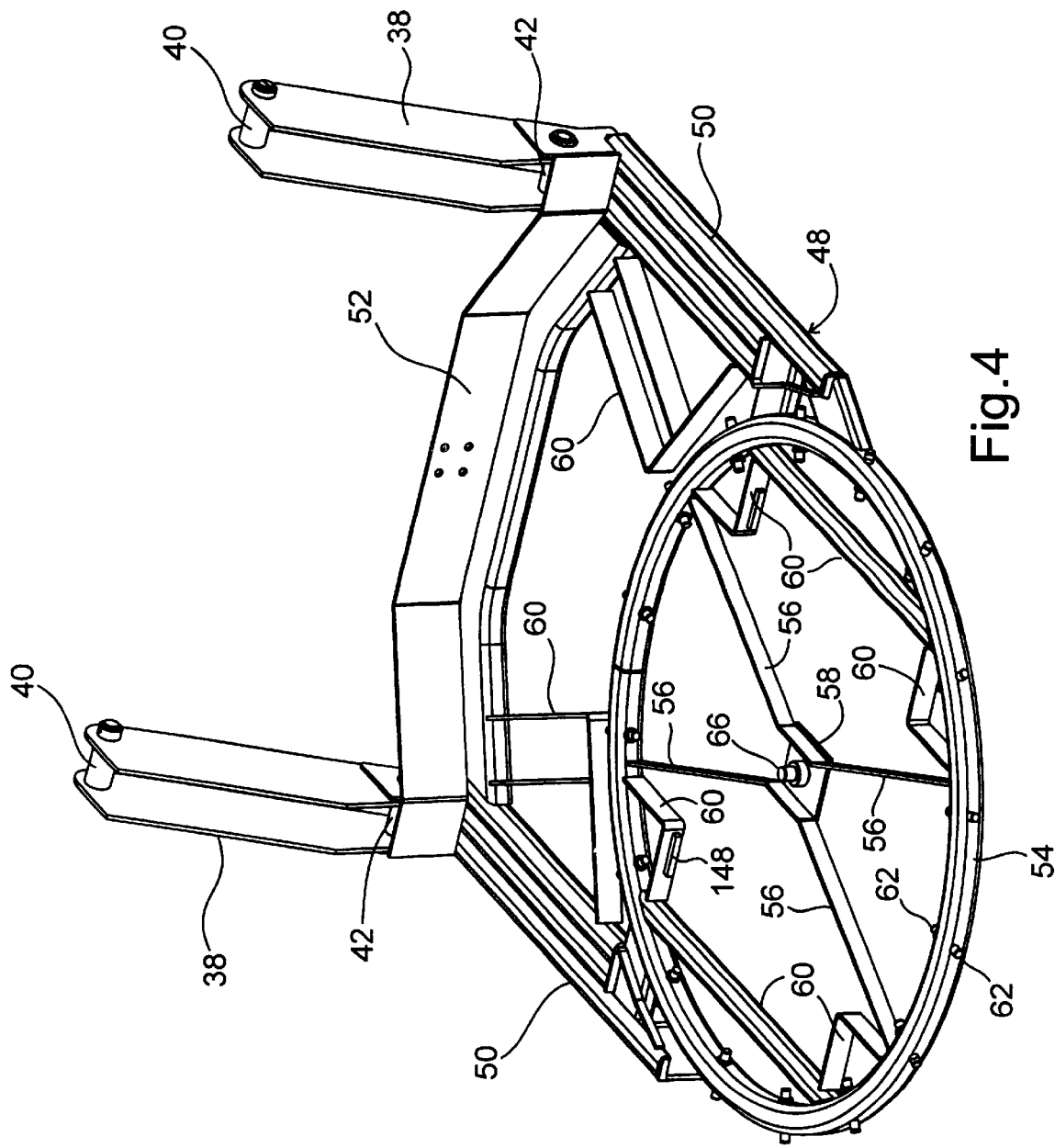
FIG. 4 is a front perspective view of the platform assembly of the pallet positioner of FIG. 1 seen in isolation.
Figure 5:
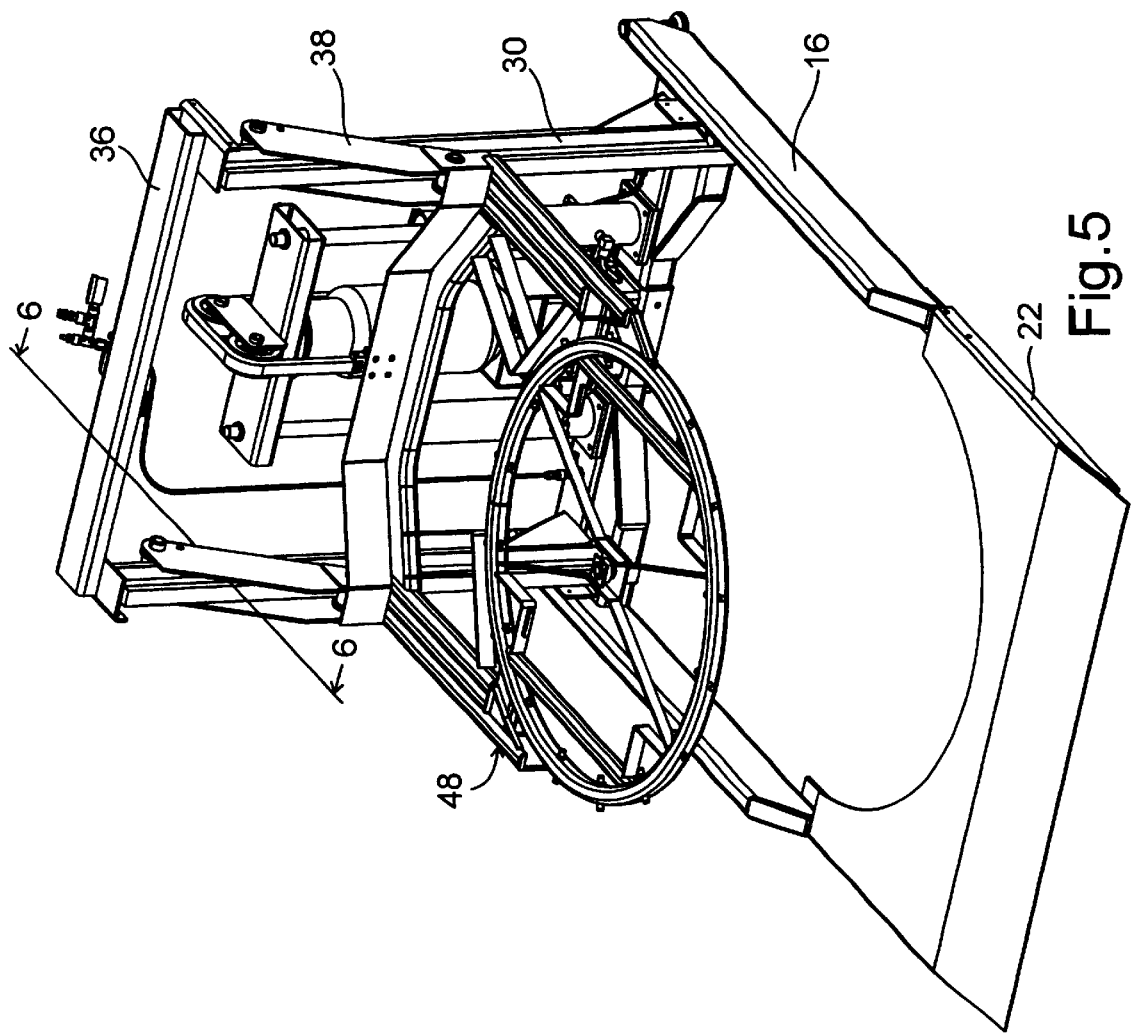
FIG. 5 shown the platform assembly of FIG. 4 installed in the pallet positioner.
Figure 6:
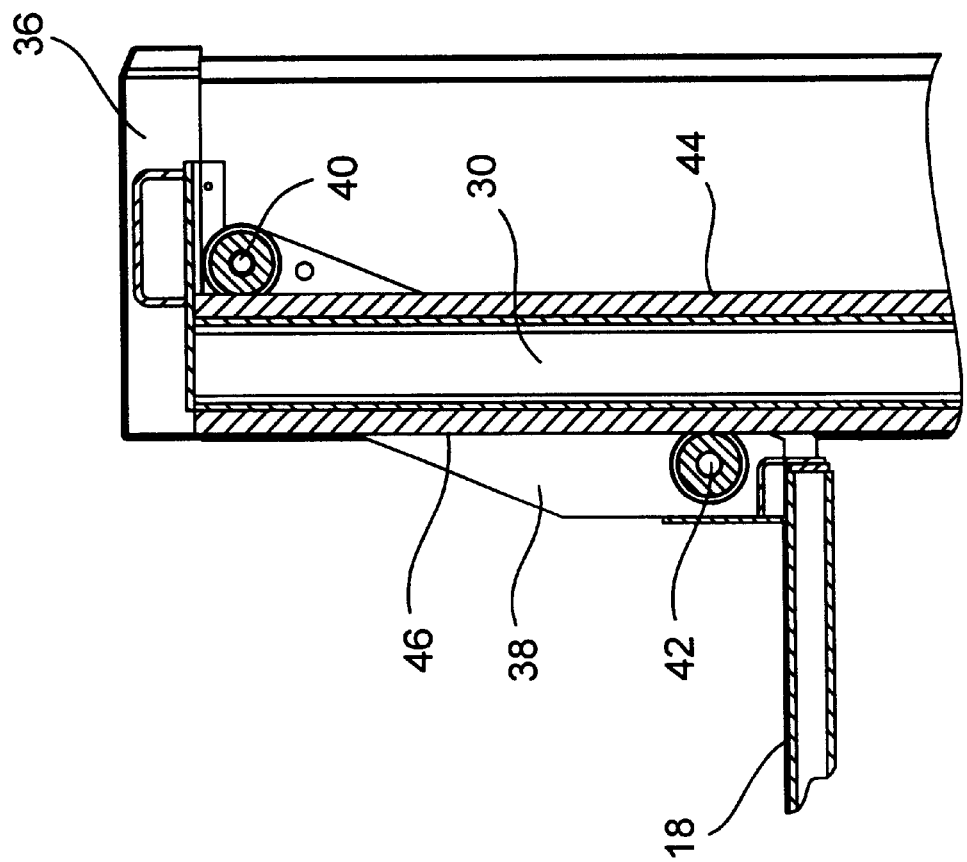
FIG. 6 is a side elevational view of a section of the pallet positioner of the invention taken from line 6—6 in FIG. 5 showing front and rear rollers supporting the platform assembly in horizontal position in rolling engagement with a vertical mast.

FIGS. 3–5 show the structural elements of each functional component of the invention. As seen particularly in FIG. 3, the vertical structure 14 includes two rigid, vertical guide masts 30 attached to a horizontal base 32 that braces the proximal ends 34 of the outriggers 16 and provides a support structure for the self-leveling mechanism of the invention. A top strut 36 is used to rigidly connect the top ends of the masts 30 and further strengthen the structure 14. FIG. 4 shows the platform assembly 12 without the plate covering the carrier 18 and without the rotating platform 20. The carrier is supported by two inclined trusses 38 with free-wheeling upper rollers 40 and lower rollers 42 adapted to roll on the flat rear and front sides 44 and 46, respectively, of the vertical masts 30 (see also FIGS. 3 and 6). The angle of the trusses 38 is selected to keep to platform 20 in substantially horizontal position at all elevations, as illustrated in FIG. 6, where the skeleton 48 of the platform assembly is shown installed on the guide masts 30. To facilitate fine adjustments, the ends of the pins supporting one or both sets of upper and lower rollers may be slightly eccentric with respect to the rollers' axes of rotation. FIG. 6 is a cross-section taken along line 6—6 in FIG. 5 to illustrate the support and vertical-rolling function of the trusses 38 and rollers 42,44 in combination with the guide masts 30.

Referring back to FIG. 4, the skeleton 48 of the platform assembly includes a plurality of thin horizontal beams 50 that project forward from a bracket 52 attached to the trusses 38 to provide a support for the platform 20 of the invention. A circular frame 54 for the platform 20 is attached to the structure formed by the beams 50 and includes cross-beams 56 that converge to a support plate 58 at the center of the circular frame 54. The beams 50 and the frame 54 are preferably constructed with thin square tubing (such as about 1.5×1.5 inches on the sides and ³⁄₁₆ inches thick), and the cross-beams 56 of thin flat bars, to improve strength and minimize the weight of the platform assembly. Reinforcing braces 60 are also preferably used to further strengthen the structure.

Figure 7:
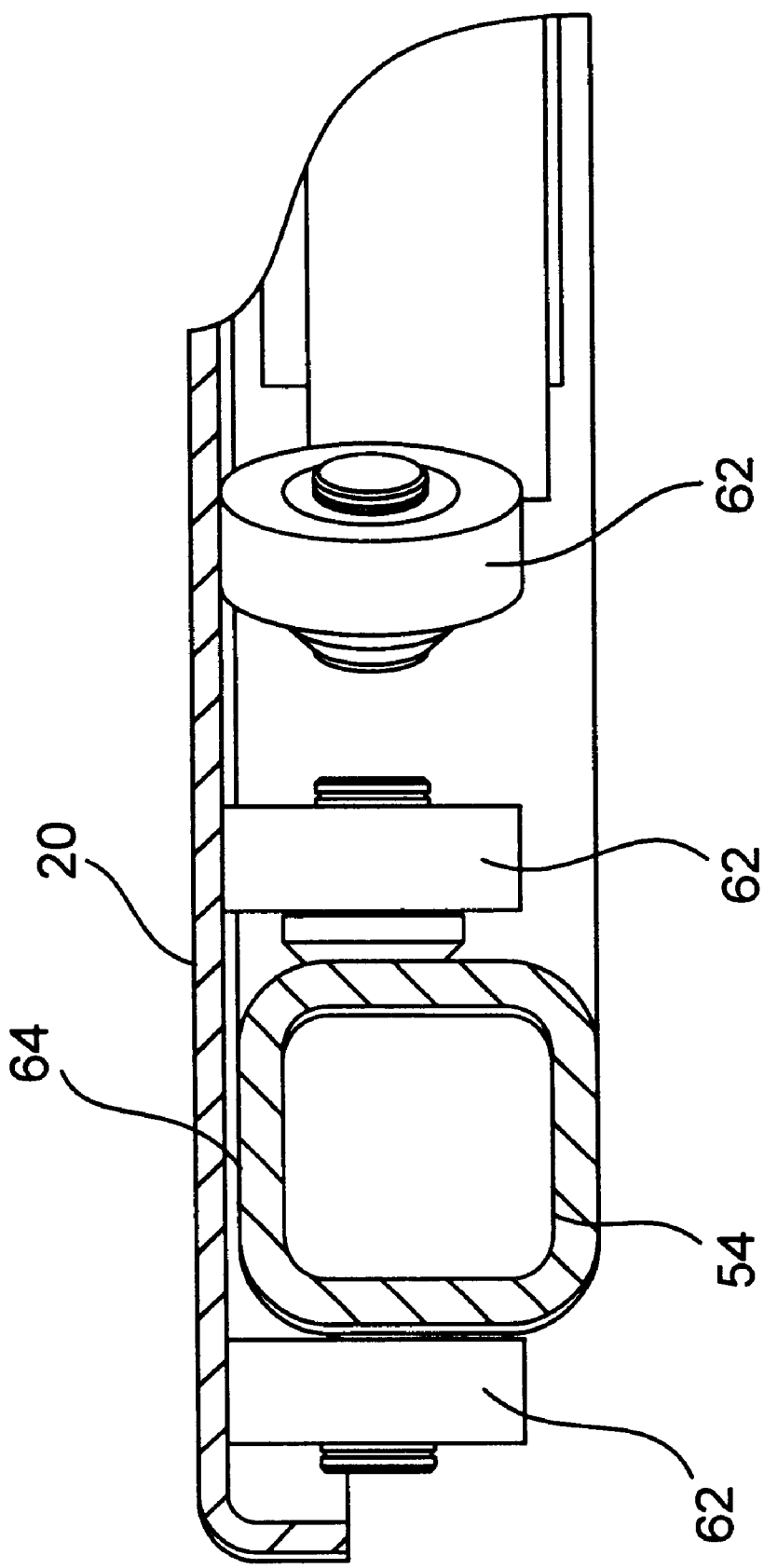
FIG. 7 is a side elevational view of another section of the pallet positioner of the invention taken from line 7—7 in FIG. 1 showing vertical rollers supporting the periphery of the platform in rotational rolling engagement with the circular frame of the platform assembly.
Figure 8:
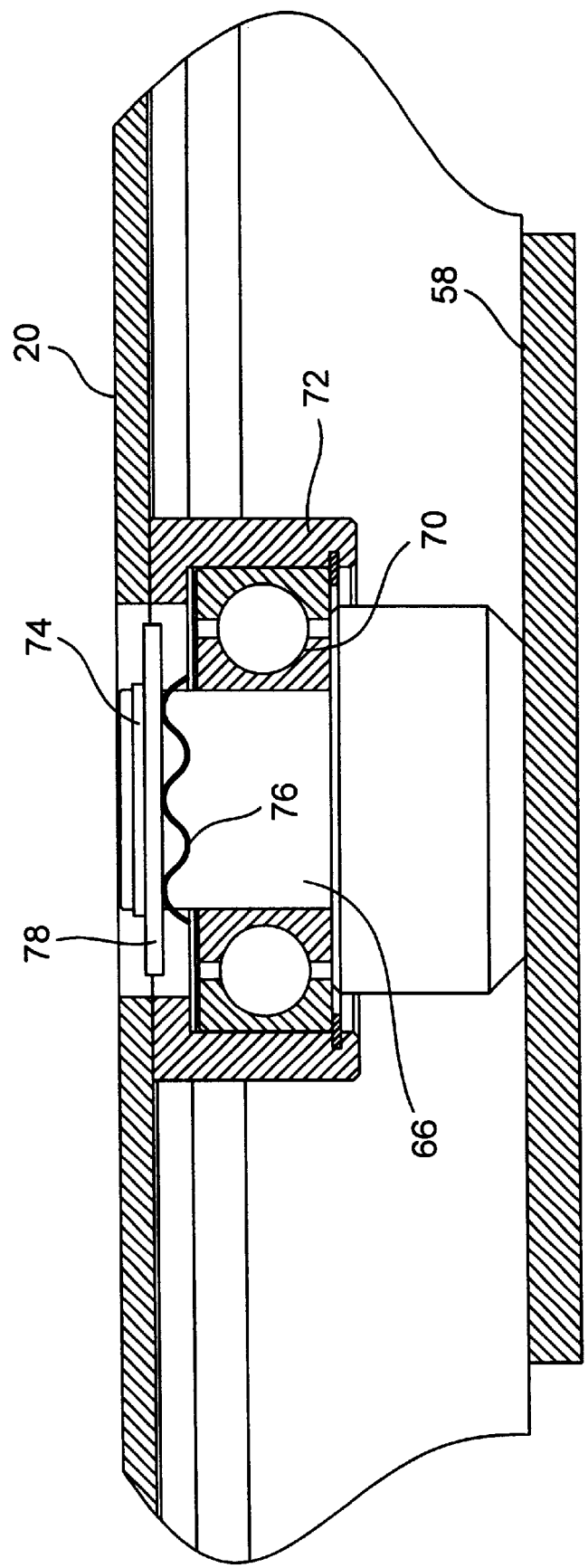
FIG. 8 is a side elevational view of yet another section of the pallet positioner of the invention taken from line 8—8 in FIG. 1 showing the bearing/pivot arrangement supporting the center of the platform in rotational engagement with the circular frame of the platform assembly.

As also seen more clearly in the enlarged partial view of FIG. 7, the circular frame 54 includes multiple pairs of vertical rollers 62 mounted at regular intervals inside and outside the length of the frame. The rollers provide support for the platform 20 of the invention; therefore, they must be installed with sufficient clearance 64 to allow the rotation of the platform over the frame 54. A center pivot 66 in the plate 58 is journaled in a bearing at the center of the platform 20 to maintain it in a centered position and avoid contact between the rollers 62 and the peripheral lip 68 of the platform. FIG. 8 shows in detail the larger, bottom portion of the pivot 66 welded to the plate 58 at the center of the circular frame 54. The smaller, top portion of the pivot 66 is coupled with a bearing 70 nested in a housing 72 that is welded to the circular platform 20 for rotation around the axis of the pivot 66. The pivot 66 retains the bearing 70 (and correspondingly the platform 20) in place by means of a snap ring 74 installed in the top portion of the pivot. An annular spring 76 urges the bearing downward against a conventional washer 78 held in place by the snap ring 74. Thus, in order to lift the platform off the carrier of the invention, the snap ring 74 is removed to release the pivot 66 from the bearing 70, thereby freeing it to allow their separation.

The self-leveling mechanism of the invention is illustrated in the frontal view of FIG. 3. Two double-acting hydraulic cylinders 80 are installed vertically between the masts 30 on the horizontal base 32, and a pulley block 82 is rigidly attached to the piston rods 84 extending upward from the cylinder barrels. Accordingly, a substantially rigid, extendable frame is provided within the vertical structure 14 of the invention. A pneumatic bellows 86 is installed vertically between the horizontal base 32 and the pulley block 82, such that the bellows' extension or contraction causes a corresponding raising or lowering of the pulley block 82 along a vertical plane substantially parallel to the guide masts 30. As also seen in the partially unshrouded, rear perspective view of FIG. 9 and in the simplified side view of FIG. 10, a chain 88 is attached at one end to a block 90 in the carrier bracket 52 and at the other end to a fixed bracket 92. Two pulleys 94 span the chain 88 along the front and rear sides of the bellows 86, thereby providing a two-to-one ratio between the vertical motion of the carrier 18 and that of the pulley block 82. Thus, for every inch of expansion or contraction of the bellows 86, the platform 20 is raised or lowered two inches. The length of the chain 88 is selected such that the platform assembly 12 is at its lowest position at ground level when the bellows 86 is contracted and preferably at its highest position along the guide masts 30 when the bellows is extended. Obviously, a belt, cord, strap or similar item could be used in equivalent fashion instead of a chain.

Figure 9:
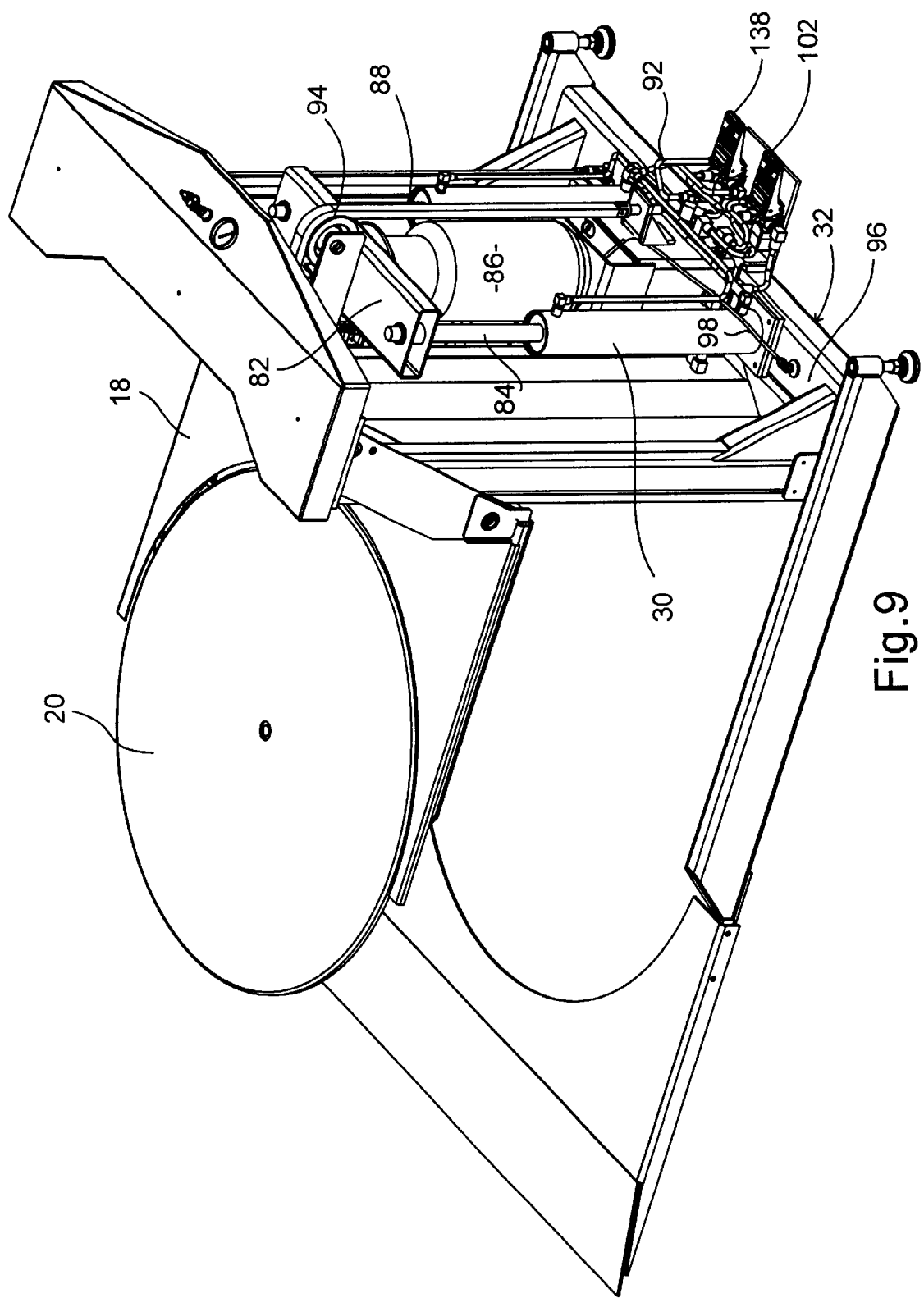
FIG. 9 is a rear perspective view of the pallet positioner of FIG. 1 without the rear cover that shrouds the hydraulic and pneumatic components.
Figure 10:
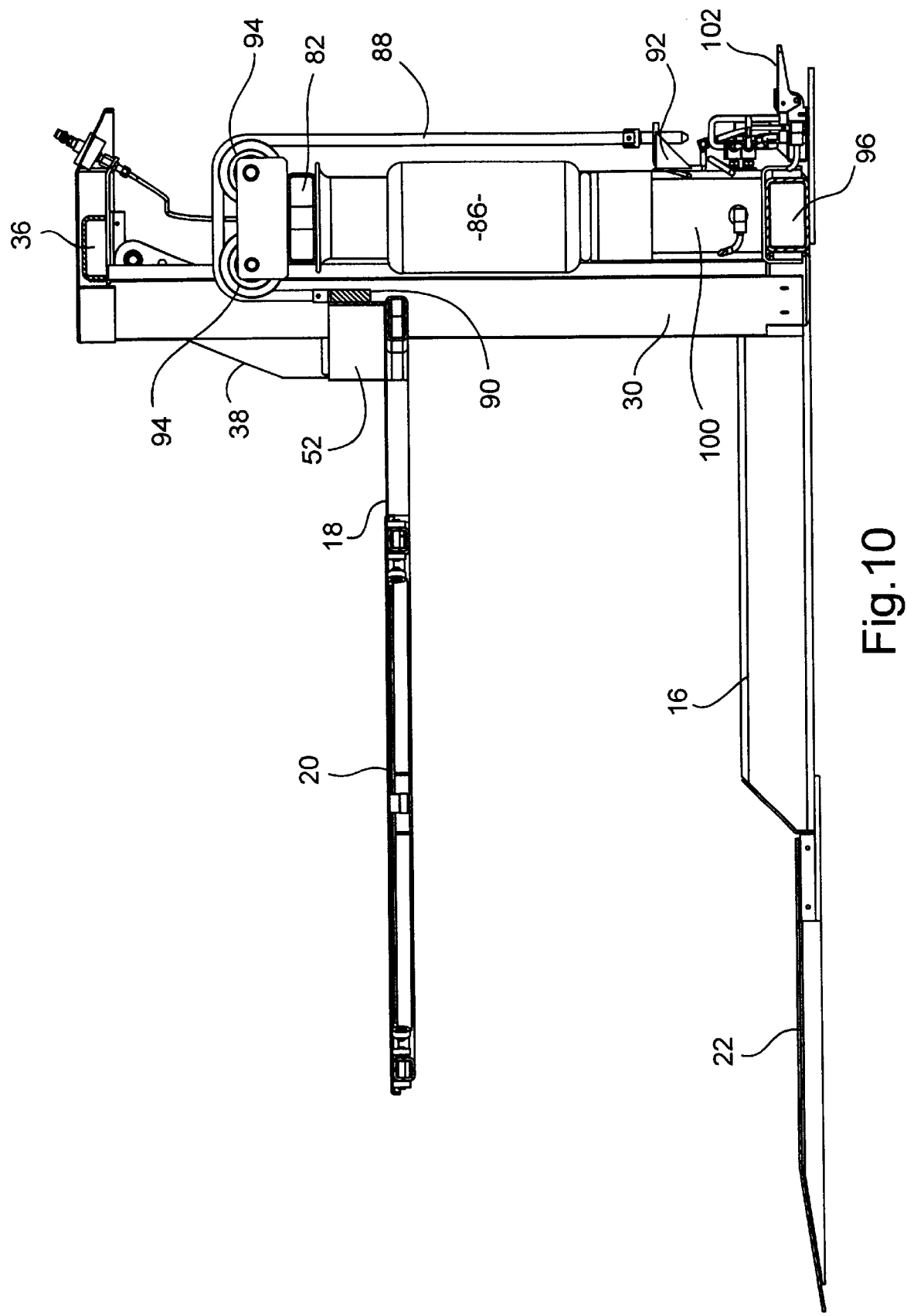
FIG. 10 is a simplified side elevational view of a section of the pallet positioner of FIG. 1, taken from a line passing between the near hydraulic cylinder and the bellows of the unit.

The pneumatic system that provides a self-leveling function to the pallet positioner of the invention consists of a fixed-volume reservoir 96 that is preferably incorporated into the horizontal base 32 and is connected to the bellows 86 via a line 98 seen in FIG. 9. The self-leveling function of bellows pneumatic systems is well understood in the art. Therefore, it is not detailed here. The hydraulic system coupled to the pneumatic bellows according to the invention includes a hydraulic-fluid reservoir 100 connected to both cylinders 80 through a piping circuit illustrated alternatively in the schematic diagrams of FIGS. 11 and 12.

Figure 11:
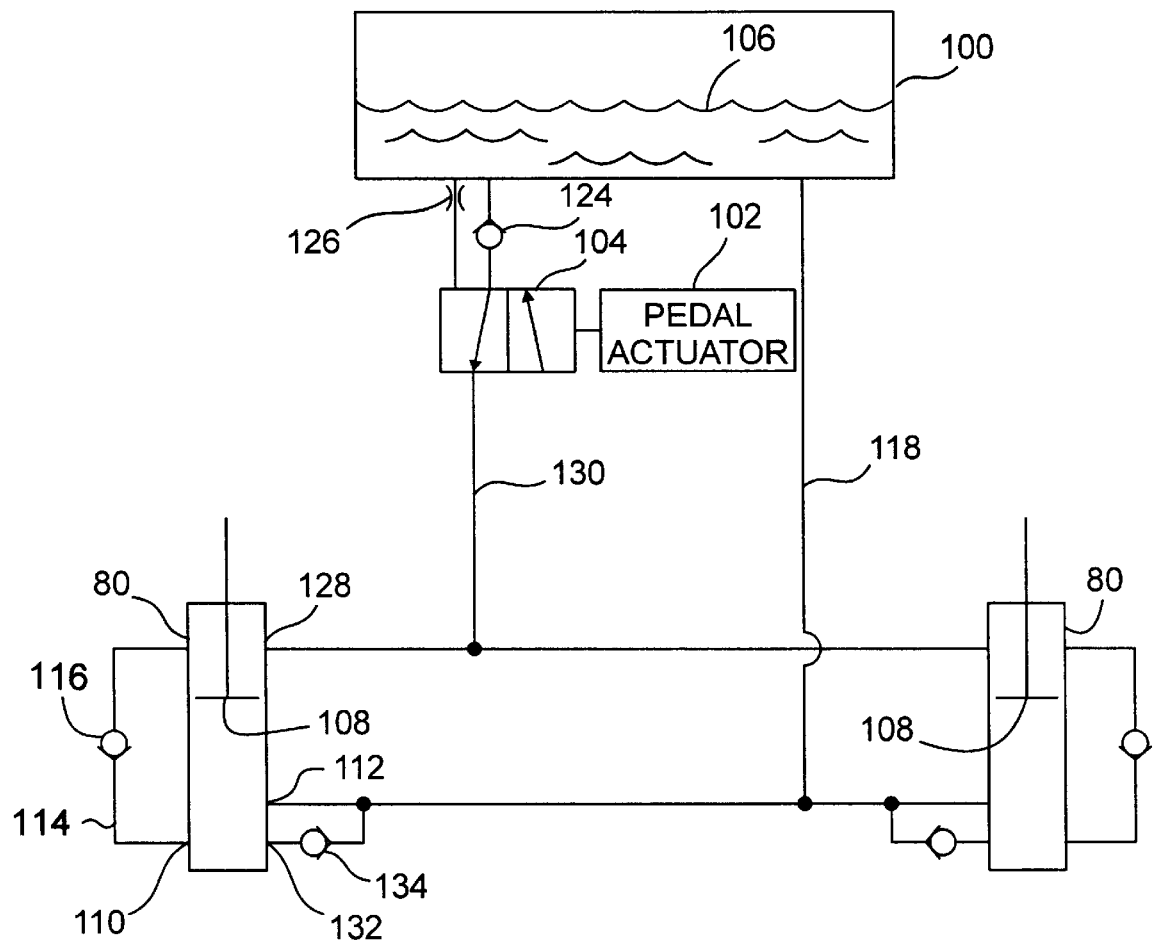
FIG. 11 is a diagram of the hydraulic system of the invention according to a preferred, single-pedal embodiment.

In a single-pedal implementation, illustrated in FIG. 11, the hydraulic system is controlled by a pedal 102 that actuates a normally-open control valve 104 through which hydraulic fluid 106 is withdrawn from the reservoir 100 and flows into the upper side of each cylinder 80 as the pistons 108 are lowered under the weight of increasing loads placed on the platform 20 of the pallet positioner against the upward force exerted by the bellows 86. During the descent of the pistons 108, the fluid present in the lower side of the cylinders (due to their double-acting nature) is forced out through multiple lower ports 110 and 112. Port 110 feeds a bypass line 114 to the upper side of the cylinder 80 through a check valve 116. Port 112, on the other hand, feeds an open return line 118 to the reservoir 100.

Figure 13:
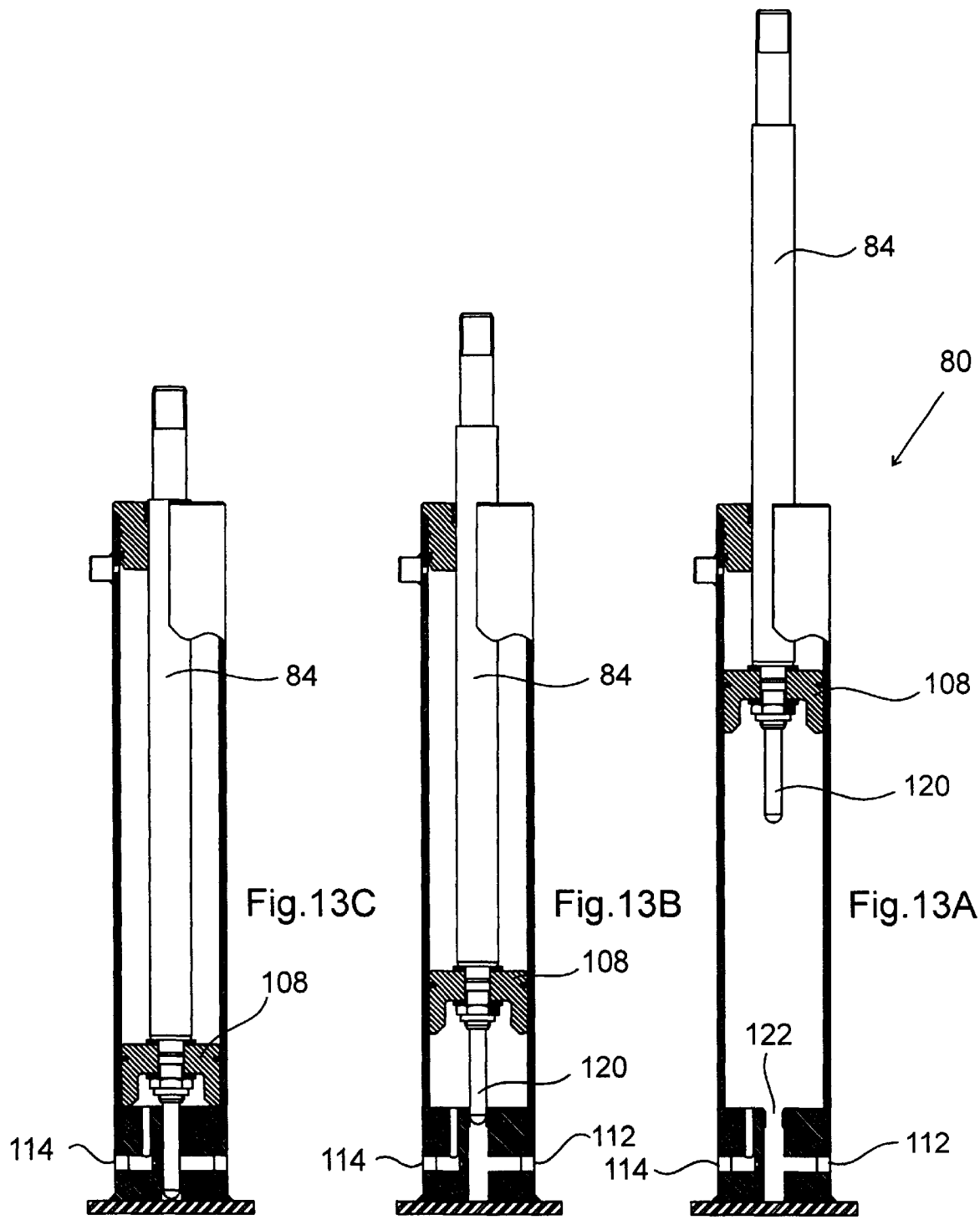
FIGS. 13A–13C illustrate the internal details of each hydraulic cylinder used for the invention.

FIGS. 13A–13C illustrate the internal details of each cylinder 80 used for the invention. The lower side of the piston 108 is fitted with a plunger rod 120 adapted to penetrate and block fluid passage through a conforming bore 122 connected to port 112. Thus, when the plunger rod 120 is introduced into the bore 122 as the piston 108 approaches the bottom of its travel, the decent of the piston is stopped because the fluid can no longer exit through port 112. Because a check valve 124 prevents the return of fluid through the control valve 104, and because a larger volume of fluid is contained in the lower than in the upper side of the cylinder 80 (due to volume occupied in the upper side by the rod 84), the fluid also cannot pass through port 110, which locks the descent of the piston at the height where the plunger rod 120 first engages the bore 122, as illustrated in FIG. 13B.

This cylinder configuration affords an economical means for advantageously implementing a safety feature that prevents entanglement of an operator's feet between a misaligned pallet and the outriggers 16 as the carrier 18 approaches ground level. To that end, the bore 122 is sized to first engage the plunger rod 120 when the carrier 18 and the platform 20 are sufficiently high to clear the outriggers 16. This stop also forces the operator to check the alignment of the pallet with the outriggers before the platform is lowered all the way. This last step requires intervention by an operator who, by stepping on the pedal 102, can switch the control valve 104 to the exhaust port 126, thereby allowing the release of fluid from the lower side of the cylinder into the reservoir 100 through the bypass line 114, the upper side of the cylinder, the upper port 128, and the feed line 130. This action allows the piston 108 to reach bottom, as illustrated in FIG. 13C, and causes the platform 20 to reach ground level.

When the pedal 102 is released, the platform will remain at ground level even after the load is removed from the pallet positioner because the check valve 124 prevents exhausting any fluid from the upper side of the cylinder. Thus, the cylinders 80 remain locked in place and the carrier 18 is safely kept at ground level even against the upward pressure exerted by the bellows 86. In order to raise the carrier to its upper position to load a new pallet, the pedal 102 is again actuated to switch the position of the control valve 104 to its exhaust port 126. Now the hydraulic fluid is able to flow back to the reservoir 100 from the upper side of the cylinder, while the space correspondingly created in the lower side is filled from the reservoir through the lower port 112. An additional lower port 132 (not shown in FIGS. 13A–C), connected to line 118 through a check valve 134, is provided to supply the lower side of the cylinder prior to the disengagement of the plunger rod 120 from the bore 122.

Figure 12:
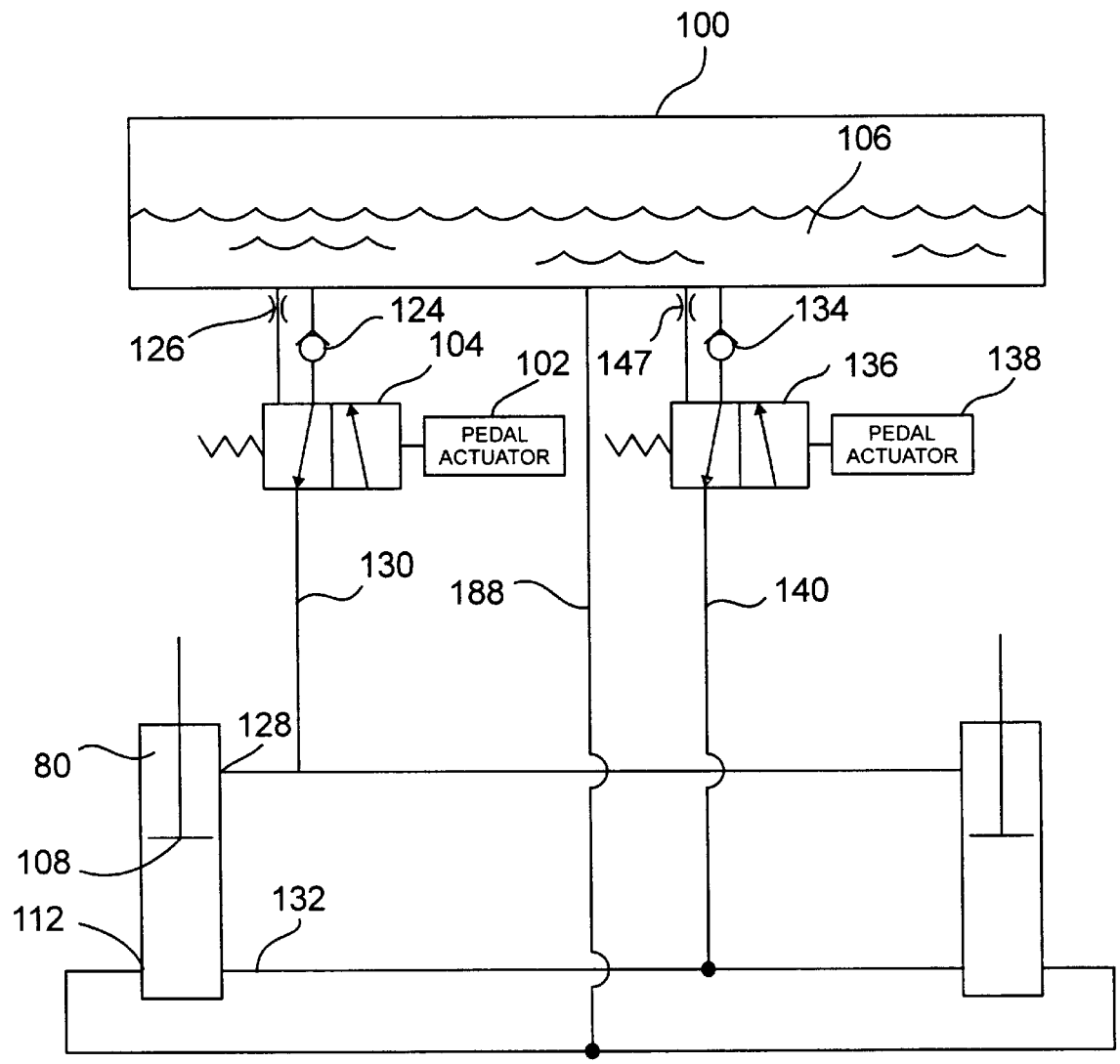
FIG. 12 is a diagram of the hydraulic system of the invention according to a double-pedal embodiment.

FIG. 12 is a schematic diagram of a double-pedal implementation of an hydraulic system used for the invention. Rather than utilizing a bypass line 114 to exhaust the lower side of the cylinder 80 through the control valve 104 during the last portion of the piston's descent (i.e., after the plunger rod 120 blocks the bore 122), an additional control valve 136 activated by a second pedal 138 are utilized. The new valve 136 is normally open and controls the flow through an additional line 140 which is connected to the lower port 132 and incorporates the check valve 134 of each cylinder. Thus, the final travel segment of the piston 108 toward ground level is activated by pressing the pedal 138, which enables the release of fluid from the lower side of the cylinder through its exhaust port 142. In all other respects, the embodiment of FIG. 12 functions the same way as that described for FIG. 11.

Figure 14:
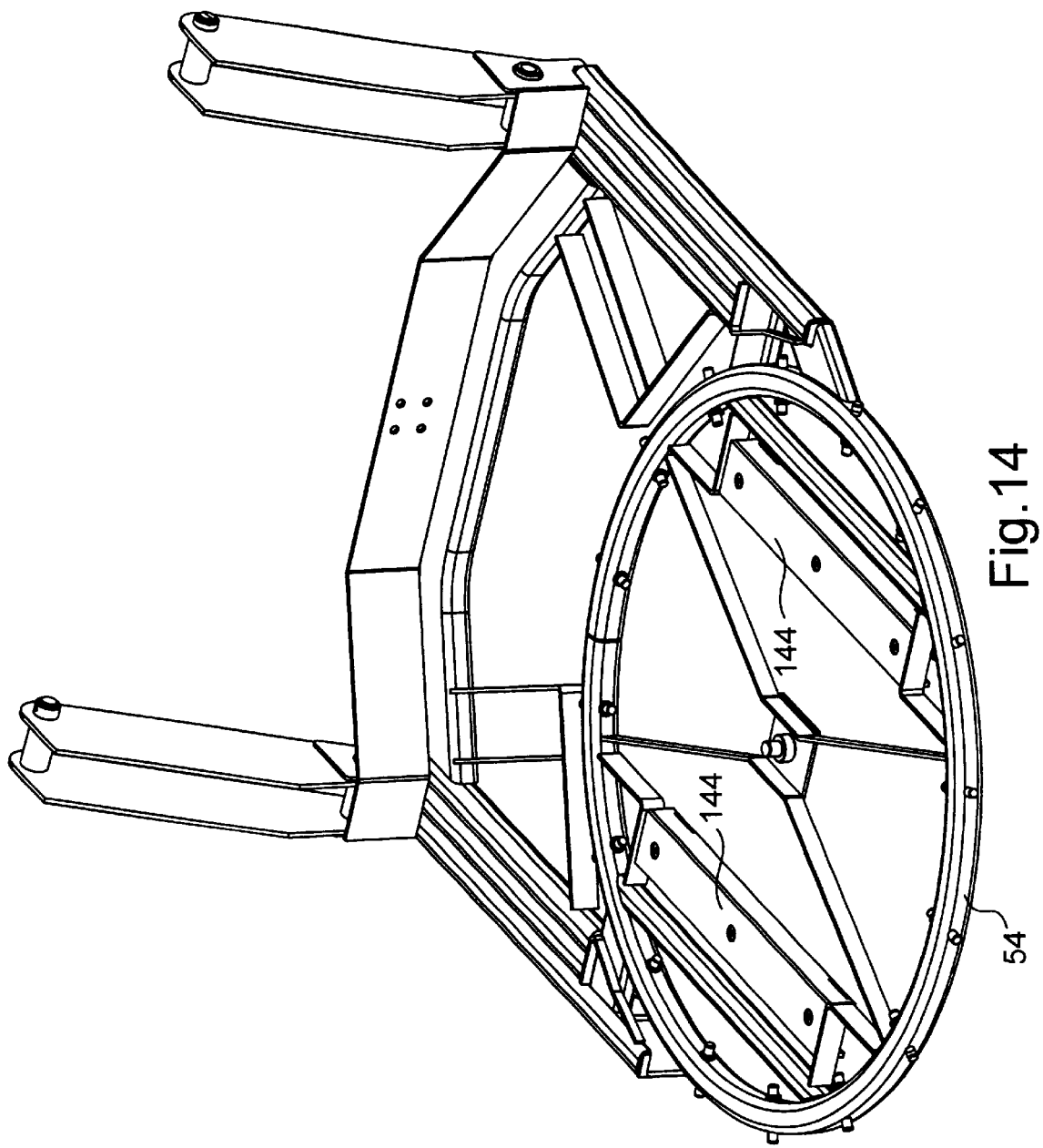
FIG. 14 is a front perspective view of the same platform assembly of FIG. 4 showing two brake mechanisms installed within the circular frame that supports the platform.

According to another aspect of the invention, a brake mechanism 144 is used to automatically prevent rotation of the platform 20 as it approaches ground level. As illustrated in FIG. 14, the brake mechanism 144 is installed, preferably in pairs, under the platform 20 within the circular frame 54 of the platform assembly. FIGS. 15A–15C illustrate the operation of the brake mechanism 144, which consists of an upside-down channel structure 146 (shown in sectioned view) slidably anchored to two horizontal bars 148 protruding from the reinforcing braces 60 in the circular frame 54 (see also FIG. 4). Thus, by virtue of the channel geometry of the structure 146, the brake mechanism 144 is able to slide vertically with respect to the bars 148 and the circular frame 54. The bottom portion of the structure 146 includes two downward-facing thimble-like cups 150 attached to the structure through corresponding bottom plates 152. Each cup houses a flat-wire compression spring 154 anchored to the top plate 156 of the structure 146 and adapted to urge the cup 150 downward. A rubberized brake layer 158 held in place by screws 160 covers the top plate of the brake mechanism 144.

As seen in FIG. 15A, when the carrier of the pallet positioner is off the ground G, the top brake layer 158 of the brake mechanism 144 is separated from the platform 20 by a gap 162, such that the platform is free to rotate unencumbered by the brake. When the bottoms of the cups 150 touch the ground, as illustrated in FIG. 15B, they are lifted upward and compress the springs 154 to also urge the channel structure 146 toward the bottom surface of the platform 20. When sufficient displacement has been achieved, such as when the carrier rests on the ground, the brake layer 158 is frictionally engaged to the platform to prevent its rotation, as seen in FIG. 15C. Obviously, as the carrier and the platform are raised during the next cycle of operation, the cups 150 drop down and release the brake.

FIGS. 16A–16D illustrate four stages of the typical cycle of operation of the pallet positioner 10 of the invention. FIG. 16A shows the positioner with the platform assembly 12 raised to its maximum height to begin loading. A pallet 164 is placed on the rotating platform 20 either at ground level or in its raised position. As boxes 166 are stacked on the platform, the carrier height is automatically lowered against the pressure of the pneumatic bellows system to maintain a comfortable loading height, as shown in FIG. 16B. During this time, the orientation of the pallet can be changed at will as needed by rotating the platform 20. When the carrier reaches the minimum elevation for clearance of the outriggers (that is, when the plunger rods 120 in the cylinders begin to penetrate the bores 122), the descent is automatically interrupted for a safe operation. This stage is illustrated in FIG. 16C. Finally, when the pedal 102 (or pedal 138, in the two-pedal embodiment) is depressed, the carrier is allowed to reach the ground under the weight of the load. A pallet truck 168 can then be placed within the bottom runners of the pallet 164 to remove the pallet and its load from the pallet positioner 10 of the invention. Thereafter, the cycle is restarted by again depressing pedal 102, as explained above.

It is noted that the pressure of the air (or other gas that may be utilized) in the pneumatic system of the invention is selected to provide the desired self-leveling action, which is a function of the density of the material loaded on the pallet. Accordingly, an external normally-closed inlet valve 170 is provided to appropriately pressurize the system.

Various changes in the details, steps and components that have been described may be made by those skilled in the art within the principles and scope of the invention herein illustrated and defined in the appended claims. For example, the base of the pallet positioner, with or without outriggers projecting in any direction, could be secured to the floor in a stationary implementation of the invention. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and procedures.

I claim:

1. A self-adjusting pallet positioner comprising:
   a base;
   a vertical support structure rigidly attached to the base;
   a platform assembly cantilevered from the vertical support structure;
   a self-leveling system adapted to urge the platform assembly upwards, the self-leveling system including a controllable moving member which is expandable and contractable, is connected to the platform assembly and has an extended condition and a contracted condition, and the self-leveling system further including means for urging the moving member into the extended condition, said urging means being designed to permit the moving member to assume the contracted condition in response to a change in weight of a load when loading the platform assembly; and
   means for controlling the motion of the platform assembly.

2. The pallet positioner of claim 1, wherein said platform assembly includes a carrier and a platform rotatably mounted thereon.

3. The pallet positioner of claim 2, further comprising a releasable brake mechanism for preventing rotation of the platform when the platform assembly is at ground level.

4. The pallet positioner of claim 1, wherein said means for controlling the motion of the platform assembly includes a hydraulic cylinder coupled to the moving member and cooperating therewith to support the platform assembly.

5. The pallet positioner of claim 1, wherein the platform assembly has a lowermost position and said means for controlling the motion of the platform assembly includes a safety stop for preventing an upward motion of the platform assembly when the platform assembly is in the lowermost position, the safety stop being releasable to permit an upward motion of the platform assembly from the lowermost position.

6. The pallet positioner of claim 5, wherein said means for controlling the motion of the platform assembly includes a hydraulic cylinder which cooperates with the moving member to support the platform assembly, the safety stop comprising means for preventing the flow of hydraulic fluid into and out of the hydraulic cylinder.

7. The pallet positioner of claim 1, wherein the platform assembly has an uppermost position and a lowermost position, said means for controlling the motion of the platform assembly including a safety stop for preventing a downward motion of the platform assembly through an intermediate position between the uppermost and lowermost positions, the safety stop being releasable to permit a downward motion of the platform assembly through the intermediate position.

8. The pallet positioner of claim 7, wherein said means for controlling the motion of the platform assembly includes a hydraulic cylinder which cooperates with the moving member to support the platform assembly, the safety stop comprising means for preventing the flow of hydraulic fluid into and out of the hydraulic cylinder.

9. The pallet positioner of claim 1, further comprising a block attached to an upper end of the moving member, a pulley attached to the block, and a chain in the pulley connecting a fixed point of the base and the vertical support structure to the platform assembly, such that a vertical motion of the moving member produces a corresponding vertical motion of the platform assembly, said moving member having a lower end which is supported by said base.

10. The pallet positioner of claim 9, wherein said means for controlling the motion of the platform assembly includes a hydraulic cylinder attached to the base and to the block, such that a vertical motion of the moving member produces a corresponding displacement of a piston in the cylinder, the cylinder cooperating with the moving member to support the platform assembly.

11. The pallet positioner of claim 1, wherein the vertical support structure includes two parallel guide masts.

12. The pallet positioner of claim 1, further comprising a pair of outriggers projecting from the base at ground level.

13. The pallet positioner of claim 12, further comprising a ramp connected to the outriggers.

14. The pallet positioner of claim 1, wherein the self-leveling system is pneumatic and the moving member comprises an inflatable and deflatable element, the self-leveling system including a source of pressurized gas for inflating the inflatable and deflatable element.

15. The pallet positioner of claim 14, wherein the source of pressurized gas comprises a gas reservoir.

16. The pallet positioner of claim 15, wherein the base comprises a sealed member which provides at least a portion of the gas reservoir.

17. The pallet positioner of claim 14, wherein the inflatable and deflatable element comprises a bellows having a lower end positioned within the vertical support structure, said lower end being supported by said base.

18. A self-adjusting pallet positioner comprising:
a base;
a pair of outriggers projecting laterally from the base at ground level;
a pair of vertical, parallel guide masts rigidly attached to the base;
a platform assembly cantilevered from the guide masts between the lateral outriggers;
a pneumatic self-leveling system adapted to urge a block upwards, the self-leveling system including a bellows which comprises a lower end positioned within the two vertical guide masts and an upper end attached to the block, said lower end being supported by said base, and the bellows having an extended condition and a contracted condition, the self-leveling system further including a gas reservoir for urging the bellows to the extended condition, and said gas reservoir being designed to permit the bellows to assume the contracted condition in response to a change in weight of a load when loading the platform assembly;
means for urging the platform assembly upwards; and
means for controlling the motion of the platform assembly, said means for controlling the motion of the platform assembly including a pair of hydraulic cylinders which are attached to the base and to the block and cooperate with the bellows to support the platform assembly, and said urging means being connected to the block such that a vertical motion of the bellows produces a corresponding vertical motion of the platform assembly and a corresponding displacement of a piston in each of said cylinders.

19. The pallet positioner of claim 18, further comprising a ramp connected to the outriggers.

20. The pallet positioner of claim 18, wherein said platform assembly includes a carrier and a platform rotatably mounted thereon.

21. The pallet positioner of claim 20, further comprising a releasable brake mechanism for preventing rotation of the platform when the platform assembly is at ground level.

22. The pallet positioner of claim 18, wherein the platform assembly has a lowermost position and said means for controlling the motion of the platform assembly includes a safety stop for preventing an upward motion of the platform assembly when the platform assembly is in the lowermost position, the safety stop being releasable to permit an upward motion of the platform assembly from the lowermost position.

23. The pallet positioner of claim 22, wherein the safety stop includes means for preventing the flow of hydraulic fluid into and out of at least one of the hydraulic cylinders.

24. The pallet positioner of claim 22, wherein the safety stop includes means for preventing the flow of hydraulic fluid into and out of at least one of the hydraulic cylinders.

25. The pallet positioner of claim 18, wherein the platform assembly has an uppermost position and a lowermost position, said means for controlling the motion of the platform assembly including a safety stop above the outriggers for preventing a downward motion of the platform assembly through an intermediate position between the uppermost and lowermost positions, the safety stop being releasable to permit a downward motion of the platform assembly through the intermediate position.

26. The pallet positioner of claim 18, wherein the base comprises a sealed member which provides at least a portion of the gas reservoir.

27. The pallet positioner of claim 18, wherein said urging means includes a pulley attached to the block, and a chain in the pulley connecting a fixed point on the base and the guide masts to the platform assembly.

28. A self-adjusting pallet positioner comprising:
a base;
means for securing the base in a fixed, stationary position;
a vertical support structure rigidly attached to the base;
a platform assembly cantilevered from the vertical support structure;
a pneumatic self-leveling system adapted to urge the platform assembly upwards, the self-leveling system including a bellows which is connected to the platform assembly and comprises a lower end positioned within the vertical support structure, said lower end being supported by said base, and the bellows having an extended condition and a contracted condition, the self-leveling system further including a gas reservoir for urging the bellows to the extended condition, and said gas reservoir being designed to permit the bellows to assume the contracted condition in response to a change in weight of a load when loading the platform assembly; and
means for controlling the motion of the platform assembly.

* * * * *